United States Patent
Weis et al.

(10) Patent No.: US 8,204,228 B2
(45) Date of Patent: Jun. 19, 2012

(54) GROUP KEY MANAGEMENT RE-REGISTRATION METHOD

(75) Inventors: Brian Weis, San Jose, CA (US); David McGrew, Poolesville, MD (US)

(73) Assignee: Cisco Technology, Inc., San Jose, CA (US)

(*) Notice: Subject to any disclaimer, the term of this patent is extended or adjusted under 35 U.S.C. 154(b) by 861 days.

(21) Appl. No.: 12/330,688

(22) Filed: Dec. 9, 2008

(65) Prior Publication Data
US 2010/0142711 A1 Jun. 10, 2010

(51) Int. Cl.
*H04L 9/08* (2006.01)
*G06F 7/04* (2006.01)
*G06F 17/30* (2006.01)

(52) U.S. Cl. .................. 380/277; 726/26; 726/9
(58) Field of Classification Search .......... None
See application file for complete search history.

(56) References Cited

U.S. PATENT DOCUMENTS

| | | | | |
|---|---|---|---|---|
| 6,148,404 A * | 11/2000 | Yatsukawa | ............... | 726/2 |
| 6,400,701 B2 * | 6/2002 | Lin et al. | ............... | 370/336 |
| 6,493,716 B1 * | 12/2002 | Azagury et al. | ............... | 1/1 |
| 7,269,727 B1 * | 9/2007 | Mukherjee et al. | ............... | 713/160 |
| 7,321,971 B2 * | 1/2008 | Wilding et al. | ............... | 713/169 |
| 7,421,578 B1 * | 9/2008 | Huang et al. | ............... | 713/163 |
| 2005/0097317 A1 * | 5/2005 | Trostle et al. | ............... | 713/163 |

* cited by examiner

*Primary Examiner* — William Powers
(74) *Attorney, Agent, or Firm* — Hickman Palermo Truong Becker Bingham Wong LLP

(57) ABSTRACT

In an embodiment, a fast group key management re-registration is described. One computer-implemented method comprises, at a key server: receiving a registration request from a network element to join a group of network elements managed by the key server; generating and storing a group member registration state comprising information identifying the network element within the group of network elements; generating a token using information from the group member registration state, wherein the token identifies the network element within the group; deleting the group member registration state for the network element at the key server; generating an encrypted token by encrypting the token using a secret key that is local to the key server; sending the encrypted token to the network element; receiving the encrypted token along with a re-registration request from the network element to re-join the group of network elements; and re-registering the network element using the encrypted token.

20 Claims, 8 Drawing Sheets

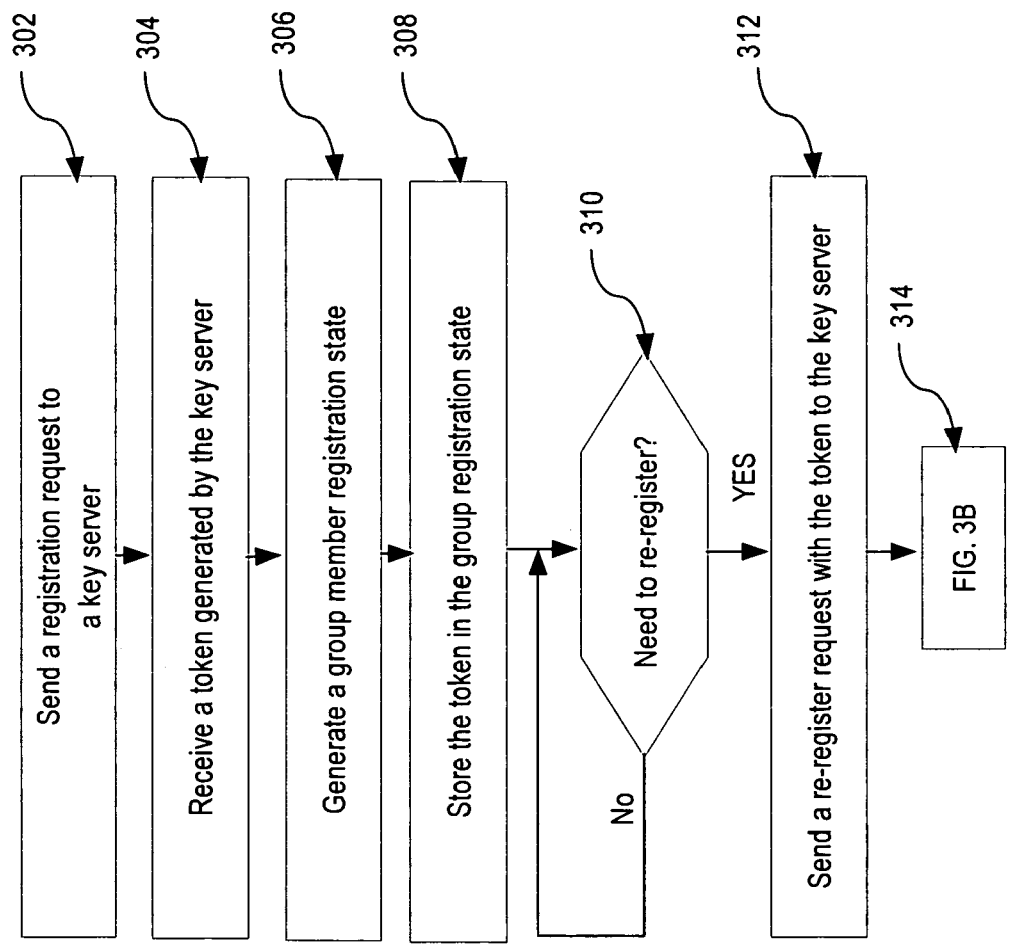

GROUP KEY MANAGEMENT RE-REGISTRATION METHOD

TECHNICAL FIELD

The disclosure generally relates to group key management re-registration with a key server.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Various kinds of networks support network device groups and group memberships. Examples of such networks may include Virtual Private Networks (VPN), networks configured using Group Encrypted Transport Virtual Private Network (GET VPN) technology, and multicast networks. These networks may be managed by group management systems, such as, for example, the Group Domain of Interpretation (GDOI) system, that register requesters with the groups and maintain group states for the group members. GDOI is described in, for example, M. Baugher et al., "The Group Domain of Interpretation," IETF RFC 3547, July 2003. By employing various authentication and/or authorization methods, registering provides the group with desirable security measures. However, registering may also be fairly CPU intensive, time consuming and bandwidth demanding.

Once a group member successfully completes the registration process with the group management system, the member may usually remain as a group member for as long as its connection with the group is active. However, there are situations when the group member might have to register with the group again. For example, the group member might have to repeat the registration process if it did not receive its replacement keys before the expiration of its current keys. Also, the group member might have to register again if the group member network does not support multicasting, and thus re-keying is unavailable. Other examples include when the group member's workstation was shut down, the group member lost its connection with the network, the communication server failed, all or part of the network failed, or the network experiences a power outage. In those situations, the group members may have to register with the group server again, and thus repeat the CPU intensive and time consuming process.

BRIEF DESCRIPTION OF THE DRAWINGS

In the drawings:

FIG. 3A illustrates a method of a network element joining the group;

DETAILED DESCRIPTION

Figure 1:
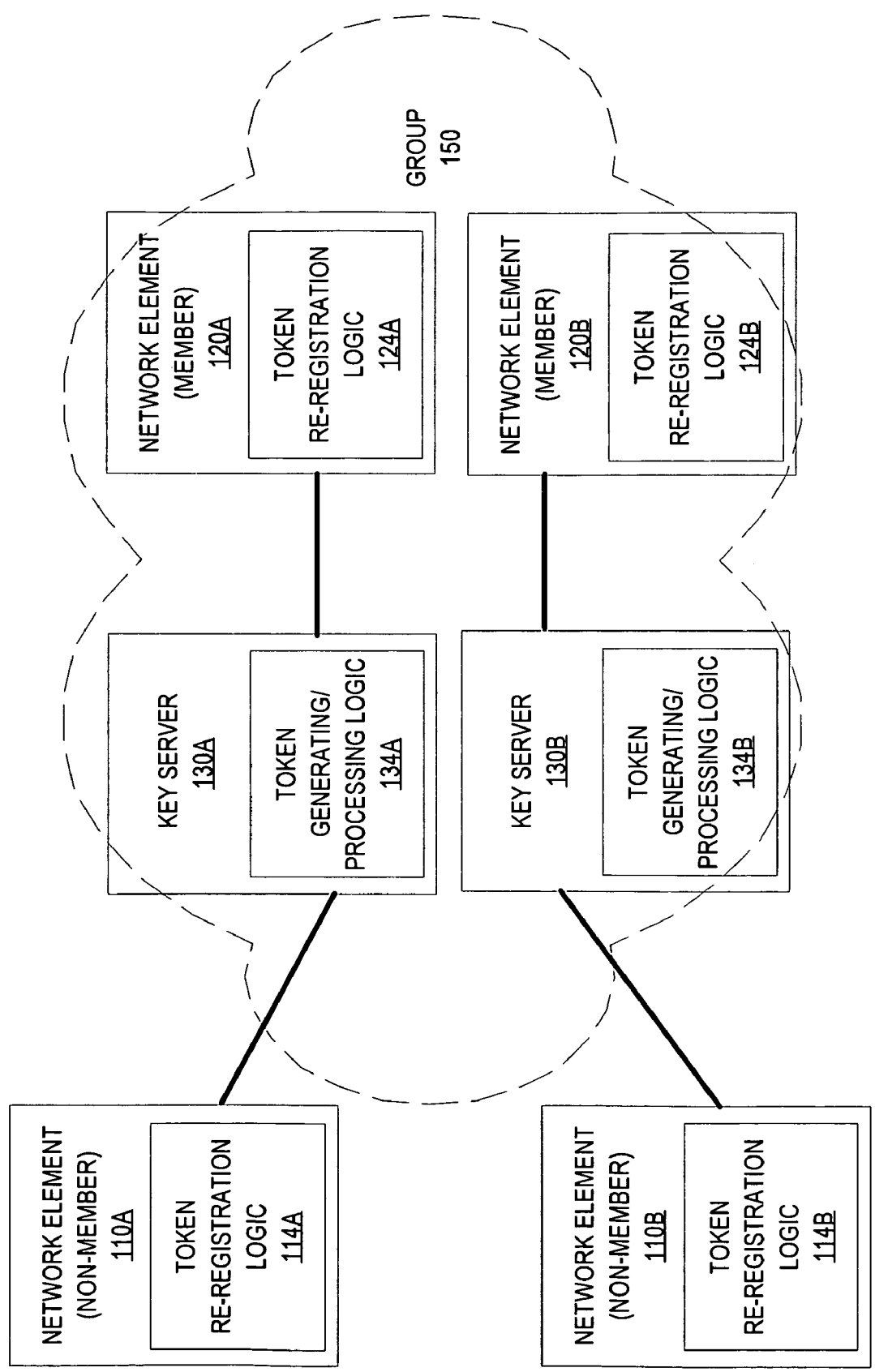
FIG. 1 illustrates an example system configured for fast group key management re-registration.

Approaches for group key management re-registration are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:
   1.0 General Overview
   2.0 Structural and Functional Overview
   3.0 Implementation examples
      3.1 Fast group key management and re-registration
      3.2 Exchanging the token between the key server and the network element
      3.3 Key server managing fast group key registration
      3.4 Key server managing fast group re-registration
      3.5 Network element joining the group
      3.6 Network element rejoining the group
   4.0 Implementation Mechanisms—Hardware Overview
   5.0 Extensions and Alternatives
   1.0 General Overview In an embodiment, a group key management re-registration computer-implemented method comprises, at a key server, receiving a registration request from a network element to join a group of network elements managed by the key server; generating and storing a group member registration state comprising information identifying the network element belonging to the group of network elements; generating a token using information from the group member registration state, wherein the token identifies the network element belonging to the group of network element; deleting the group member registration state for the network element at the key server; generating an encrypted token by encrypting the token using a secret key that is local to the key server; sending the encrypted token to the network element; receiving a re-registration request from the network element to rejoin the group of network elements, wherein the re-registration request comprises the encrypted token; generating a decrypted token by decrypting the encrypted token using the secret key; using data from the decrypted token, recovering and storing the group member registration state, comprising information identifying the network element belonging to the group of network elements; and re-registering the network element using the information from the group member registration state.

In an embodiment, the method further comprises generating a new token using information from the group member registration state, wherein the new token identifies the network element that has been re-registered; deleting the group member registration state for the network element that has been re-registered; generating an encrypted new token by encrypting the new token using the secret key that is local to the key server; and sending the encrypted new token to the network element that has been re-registered.

In an embodiment, the communications between the network element and the key server are implemented using a Group Domain Of Interpretation (GDOI) protocol.

In an embodiment, the token further comprises data identifying a communication session between the network element and the key server.

In an embodiment, sending the encrypted token to the network element further comprises sending a time stamp associated with a moment in time when the token was generated.

In an embodiment, sending the encrypted token to the network element further comprises encapsulating the encrypted token into an IKE NOTIFY message.

In an embodiment, the encrypted token is treated by the network element as an opaque blob.

In an embodiment, the secret key that is local to the key server is also shared by at least one other key server.

In an embodiment, a computer-readable storage medium configured to perform the functions described above is described.

In various embodiments, the term "registration" refers to a process in which a network element sends a registration request to the group, but does not produce a token, whereas the term "re-registration" refers to a process in which the network element sends a registration request to the group and produces the token.

In various embodiments, the key server may be implemented, for example, as a group controller key server, and may perform functions such as creating and maintaining the group access keys, and enforcing the group policy by granting access to a potential group in accordance with the group policy. The network element may be a computer network user or a client who wishes to join a group or groups supported by the network. The registration request sent from the network element may, for example, identify the network element and the group or groups the network element wishes to join. The registration request may also comprise additional information identifying, for example, the type of the membership the network element wishes to obtain.

In various embodiments, the registration process may involve generating and storing a group member registration state. The registration state information for the group member or client may include, for example, client's authentication credentials, client's authorization characteristics, client's shared secret key that the client may use to derive session keys. The shared secret key may be a special key that is shared between the key server and the client, so that the client and the key server can mutually derive a new set of session keys in the future. The client's state information may be stored in the memory directly associated with the key server, or other volatile or non-volatile data storage communicatively coupled with the key server.

In various embodiments the token may comprise, for example, some or all of the client's state information described above. The token may also comprise information about the session established between the client and the key server, the rules for access, control and authorization for the group which the client wants to access. Further, the token may also identify the entities that are authorized to receive access to the group, the entities that are authorized to perform security-relevant actions, keys dissemination, policy creation, or initiation of security management actions.

In some computer networks, group security policies may require that payloads sent over the network be encrypted. For example, the payload may be encrypted with a local key-encryption key (KEK), which is generated by the key server and is local to the key server. Also, various encryption methods may be used to perform the token encryption using the local key.

In various embodiments, the network element may have to register with the group again because the connection between the network element and the group was lost, the network failure or a power outage. Since the full registration process uses significant CPU resources and bandwidth, in cases of power outage or network failure, the network element can benefit from using the re-registration process, which is less complex than the registration process and allows the key server store less data.

In a re-registration request, the network element provides a token that the network element previously received from the key server during registration. In one embodiment, the token may be sent in an encrypted form to the client, and then returned to the server in the same encrypted form. Subsequently, the key server may decrypt the token and use the decrypted token in the re-registration process.

Because the token carries information about the network element state and about the session established between the network element and the key server, once the key server completes a registration and token generation for a particular network element, the key server may delete its group member registration state for that network element.

If in the future, the particular network element requests a re-registration, such a request will be sent along with the token, and thus the key server will be able to restore the network element registration state using data from the token.

Storage space and retrieving data from large data storages is always problematic, and it is particularly an acute issue in group systems. In a typical membership group system, group member registration state data occupies a large storage space. Therefore, it is more desirable to restore the network element registration state only when the state is needed than maintaining the group member registration states for all group members all the time. Thus, instead of storing all the group member registration states for all members, the key server restores the state only for a particular member only when the key server receives a re-registration request with a valid token.

2.0 Structural and Functional Overview

FIG. 1 illustrates an example system configured for fast group key management re-registration. Using the system of FIG. 1, operated in accordance with logic described further herein, in one embodiment, a fast group key management re-registration method may be implemented.

FIG. 1 depicts a group of network elements 150, one or more network elements 110A-110B, one or more network elements 120A-120B, and one or more key servers 130A-130B. For purposes of describing an example, network elements 110A-110B are non-members of a group, and network elements 120A-120B are group members. Thus network elements 110A-110B have not yet been admitted to the group 150, whereas network elements 120A-120B have been already admitted to the group 150. Each non-member 110A-110B is communicatively coupled to the one or more key servers 130A-130B, and so is each member 120A-120B. In an embodiment, key servers 130A-130B, non-members 110A-110B and members 120A-120B may be implemented in software executed on computer hardware.

Group 150 may configured to allow various group members to communicate with each other and share group resources. Examples of group 150 may include a group of data packet routers in a Virtual Private Network (VPN), a group of routers in a Group Encrypted Transport Virtual Private Network (GETVPN), or a group of routers in a multicast network.

The non-members 110A-110B and members 120A-120B may comprise any of computers, wired or wireless communication devices, personal digital assistant (PDA) devices, or other computer devices capable of communicating with computer networks.

Key servers 130A-130B may be implemented, for example, as group controllers or computers that implement group key management systems, and may perform various managing functions within group 150, such as creating and maintaining the group access keys and enforcing the group policies by granting access to potential groups in accordance with the group policies. Examples of group key management systems may include the Group Domain Of Interpretation (GDOI) system, which permits sharing group states between interoperating group members, and which may be based on the Internet Security Association Key Management Protocol (ISKAMP). In an embodiment, key servers 130A-130B may be a part of the group key management system responsible for registering non-members 110A-110B to group 150.

Registering network elements 110A-110B to group 150 ordinarily may consume significant CPU resources and time because registration involves authentication of the client, authorization of the client, creating of the client's state information, saving the client's state information, granting the client access to the group, employing various mechanisms to ensure security of the group data, and managing client's secure access to the group The client's state information may include, for example, the client's authentication credentials, the client's authorization characteristics, and the client's shared secret key. The shared secret key may be a special key that is shared between the key server and the client, so that the client and the key server can mutually derive a new set of session keys. The client's state information may be stored in any volatile or non-volatile data storage communicatively coupled with the key server.

In one embodiment, key server 130A may comprise registration operation logic to perform registration of the non-members to the group. Registration may utilize combinations of private and public keys, passwords, identifiers or other credentials, and various authentication methods or encryption processes, such as Diffie-Hellman, RSA, or others.

Registration of a non-member with a group or a network server may use systems that use any of various policy or key management protocols. For example, registration with the group may be defined according to the Group Secure Association Key Management Protocol (GSAKMP), which is based upon the Internet Security Association Key Management Protocol (ISKAMP). GSAKMP provides policy distribution, policy enforcement, key distribution and key management for groups within a network, whereas ISKAMP defines procedures and packet formats to establish, negotiate, modify and delete Security Associations (SA), and provides a flexible structure of chained payloads in support of authenticated key exchange and security association management for pair-wise communications. GSKAMP is described in RFC 4535, and ISKAMP is described in RFC 2408.

In an embodiment, key servers 130A-130B comprise rekey operation logic configured to perform rekeying of already registered members allowing them to reconnect to group 150. In an embodiment, the processes described in RFC 3547 may be used for rekeying. The rekeying operation may be used to rekey the group if, for example, a relatively small amount of new group policy and keying material needs to be distributed.

However, lengthy network outages, power outages, and the like, can trigger missed rekeying operations. This may result in multiple simultaneous registration requests. In those situations or other scenarios, key servers 130A-130B may be unable to handle a multitude of simultaneous registration operations in a timely manner. Also, when network failures occur, rekeying may not be sufficient to restore connections to all members of the group. In those situations, key servers 130A-130B might have to perform registration of the members to the group again. An alternative solution, called a re-registration with a token, is presented below.

In an embodiment, key servers 130A-130B comprise token-based re-registration logic, described further herein, configured to re-register network elements to group 150. Re-registration may be required, for example, in the case of losing the keys, not receiving the replacement keys, a failure of the network element's hardware or software, a power outage, network outage, or network failure.

In an embodiment, the re-registration logic implements a process that is less complex and less time consuming than conventional registration. In one embodiment, the re-registration process is implemented using a token-based approach that provides data security equivalent to the conventional registration process, but with less complexity and with time savings.

In an embodiment, a token is generated during the process of non-member registration with the key server. For example, the token may be generated when the key server admits a network element to the group. The token may comprise, for example, some or all of the client's state information described above. The token may also comprise information about the session established between the client and the key server, the rules for access, control and authorization for the group which the client wants to access. Further, the token may also identify the entities that are authorized to receive access to the group, the entities that are authorized to perform security-relevant actions, keys dissemination, policy creation, and initiation of security management actions In an embodiment, each of the key servers 130A-130B comprises token generating/processing logic 134A, each of the non-members 110A-110B comprises token re-registration logic 114A-114B, and each of the members 120A-120B comprises token re-registration logic 124A-124B. Each instance of re-registration logic 114A-114B is communicatively coupled with token generating/processing logic 134A-134B, and so is re-registration logic 124A-124B.

In an embodiment, token generating/processing logic 134A may be configured to perform receiving a registration request from a non-member network element 110A, registering the network element as a member network element 120A, generating and storing a group member registration state comprising information identifying the network element belonging to the group, generating a token for the member 120A, deleting the group member registration state, encrypting the token, and sending the encrypted token to the member 120A.

Token re-registration logic 124A may perform: receiving the token from key server 130A, storing the token in a volatile or non-volatile data storage medium, and keeping the token in the storage until the token is needed for re-registration with the key server. Since the key server may intend the network element to receive the token as an "opaque blob," the token re-registration logic 124A may be unable to determine that the received token is actually encrypted.

In an embodiment, if the token was received from the key server 130A, but, for example, the connection to the key server 130A failed, then token re-registration logic 114A may perform: sending a re-registration request and the token to key server 130A. In an embodiment, when the connection between the group member and the group fails, the group member becomes a non-member, but may retain the token in a local storage at the network element.

In an embodiment, the key server generates and stores a random local key for the network element and uses the local key to encrypt and decrypt the token. The local key is not sent to the network element, however, the local key may be shared with a number of key server, which may interchangeably serve the network element.

In an embodiment, the key server may generate and attach to the token a time stamp. The time stamp may identify the point in time when the token was generated by the key server, and may be used to verify if a later received token is still valid. For example, the key server may only accept the tokens that are no more than one day old, and disregard the tokens that are older than one day. In particular, the key server may accept the tokens generated yesterday and today, but ignore the tokens generated a week ago. To determine the token's age, the key server can use the time stamp attached to the token.

In an embodiment, the key server generates random secret keys for establishing secure sessions between the network elements and the key server. Those secret keys may be stored in the network element registration states for each group member. In an embodiment, the techniques for secret key generation are described in U.S. Pat. No. 7,373,502 of David McGrew.

After the key server completes a registration of the network element with the group, and generation of the token for the group member, the key server may delete the network element registration state because that state can be reconstructed upon receiving the token from the network element. Thus, the key server may choose to deallocate the memory used to store the group member registration state, so that the deallocated memory can be used for other purposes. Because the combination of the token itself and the secret key comprises all necessary member state registration information, storing all group member registration state data at the key server may be redundant. This and other aspects of stateless server-based networks are also described in U.S. Pat. No. 7,346,773 of Nancy Cam-Winget et al.

The encrypted token may be sent to the network element as an opaque data item, also called an "opaque blob." In this context, an opaque data item is an object that the network element is incapable of decrypting or using. However, decrypting or using the token is unimportant to the network element, which only receives, stores, and later returns the token to the server.

The token may be sent to the network element in the payload portion of a communication packet. For example, in the context of GDOI, the token may be encapsulated into an IKE NOTIFY message and sent to the network element. Similarly, the network element may encapsulate the token into an IKE NOTIFY message and send the IKE NOTIFY message to the key server. The IKE NOTIFY messages may be used also for other forms of communication between the network element and the key server.

After receipt, the token can be stored by the network element in a volatile or non-volatile storage communicatively coupled to the network element. The group member may also store the token received from the key server as a part of its own key management state.

In an embodiment, the token is used by the network element when the network element needs to re-register with the group. For example, upon losing a connection with the group, the group member becomes a non-member, and the non-member may retrieve the token from its storage, encapsulate the token into, for example, an IKE NOTIFY message and return the token to the key server with a re-registration request.

Upon receiving the token, the key server decrypts the token using the local key that the key server stored for the particular network element. If the group has multiple key servers, such as GET VPN co-operative key servers, the re-registration request may be received by any of the key servers, and any of the key servers may decrypt encrypted token received from the network element and handle the re-registration process.

Using the data from the decrypted token, the key server recovers and stores the group member registration state, which comprises information identifying the network element belonging to the group of network elements. In a typical membership group system, group member registration states occupy large storage space. Therefore, it is more desirable to restore the network element registration state only when the state is needed than maintaining the group member registration states for all group members all the time. Thus, instead of storing all the group member registration states for all members, the key server restores the state only for a particular member only when the key server receives a re-registration request with a valid token. Subsequently, the key server performs a re-registration (with the token) of the network element to the group.

The re-registration with the group involves generating new token using information from the recovered group member registration state, encrypting the new token with the key server local key, sending the encrypted new token to the network element and deleting the recovered group member registration state. The encrypted new token may be encapsulated into an IKE NOTIFY message just as described above.

Sending the encrypted new token to the network element and deletion of the group member registration state for the network element end the re-registration process with the token. The re-registration process may be repeated as long as the network element sends the re-registration request along with a valid token. Each time the network element sends a re-registration request with a valid token, the key server uses the information in the token to reconstruct the group member registration state for the network element, generates yet another new token and sends the new token to the network element.

3.0 Implementation Examples 3.1. Group Key Management and Re-Registration

Figure 4A:
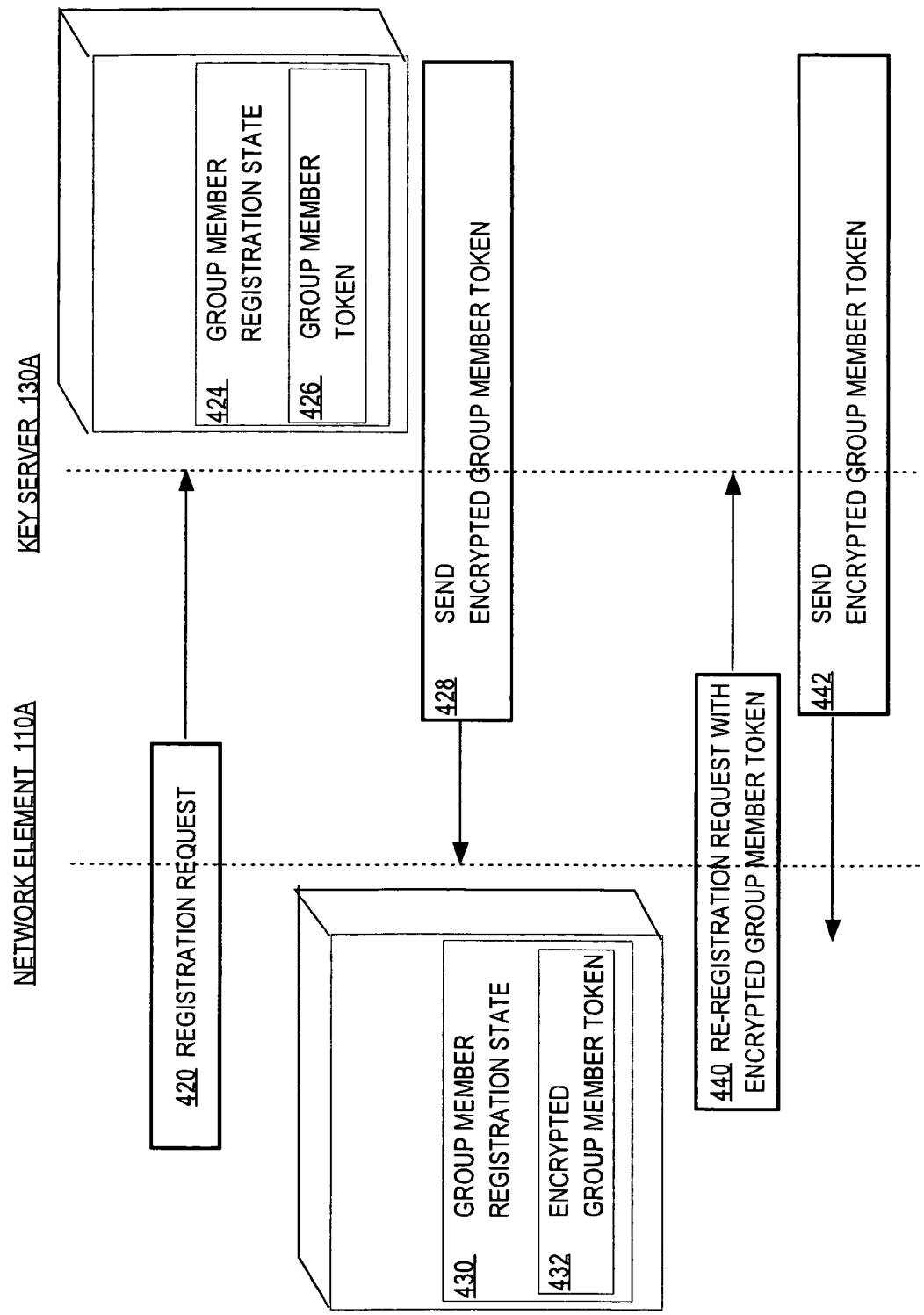
FIG. 4A illustrates a method of group key management re-registration.

FIG. 4A illustrates a method of group key management and re-registration. In an embodiment, network element 110A sends a registration request 420 to key server 130A. The registration request comprises sufficient information identifying the requesting network element, the group which the network element wishes to join, and other information necessary to fulfill the requirements of the communication protocol adopted by the network.

Upon receiving the registration request from the network element 110A, key server 130A performs a registration process (described in FIG. 1), and admits the network element 110A to the group. During the registration process, key server 130A also generates group member registration state 424 for the group member and stores the state in key server storage. Group member registration state 424 may comprise various types of information such as client authentication credentials, authorization characteristics, or shared secret keys.

Subsequently, key server 130A generates a token 426. The token may be an object containing a subset of the information included in the client registration state and the information about the session established between the client and the key server. For example, group member token 426 may comprise information about client authentication credentials, authorization characteristics, or shared secret keys. Key server 130A may also generate local keys to encrypt the token before sending the token to the client.

In an embodiment, upon completing generation of the token, key server 130A deletes the group member registration state for the network element. Because the token comprises all necessary information for restoring the group member registration state, the key server may restore that state each time the key server receives the token from the network element. Thus, the key server may deallocate the memory used to store the group member registration state so that the deallocated memory can be used for other purposes since the token and the local keys would allow reconstruction of the group member registration state 424 in the future.

Upon completing generation of the token, key server 110A may add a time stamp to the token and encrypt the token using the local key, which the key server does not share with the network element. Then, the key server may send the token to network element 110A as a confirmation that the network element was successfully admitted to the group. The token may be sent to the network element in the form of an opaque blob, and thus it may not be interpretable by the network element. In the context of GDOI, the token may be encapsulated into a payload portion of an IKE NOTIFY message.

Upon receiving the encrypted token, the network element does not decrypt the token but stores encrypted token 432 in a group member registration state 430 located in the network element's storage area. The token is stored in group member registration state 430 so that the token will be available if the network element has to re-register with the group in the future.

As depicted in FIG. 4A, if the member has lost the connection with the group, network element 110A may want to request re-registration with the group. Because network element 110A has received and stored the encrypted group member token 434, network element 110A may bypass the regular registration process and may use token-based re-registration. In token-based re-registration, instead of sending network element authorization and authentication data, network element 110A sends to key server 130A a re-registration request and the encrypted token 432. Thus token based re-registration using the encrypted token provides the network element with a re-registration option that may be faster and simpler than regular registration.

Upon receiving a re-registration request and the token, key server 130A decrypts the token. Concurrently or prior to the decryption, the key server may check the time stamp associated with the token and determine if the token is still valid. If the token's time stamp is older than for example a predetermined cut-off date, then the key server may ignore the token, and force the network element to proceed with a regular registration without the token. As described above, the registration without the token would require generating for example a group member registration state, which consumes too much time and CPU resources.

However, if the token is valid, key server 130A rebuilds the group member registration state for the network element using the data from the token. Then, key server 130A re-registers the network element using the data from the group member registration state for the network element. The re-registration with the token requires that the key server restores the group membership registration state for the network element using the data from the token, generates a new token, puts a time stamp on the token, encrypts the token and sends the encrypted token to the network element. The re-registration process may be repeated as long as the network element sends a valid re-registration request along with a valid token to the key server.

In an embodiment, token-based re-registration allows the key server to avoid storing registration state for each member. When the key server generates the token for the group member, the key server also generates local keys, which in combination with the token comprise group and member specific information. Upon sending the token to the group member, the key server retains the local keys. In the future, the key server can restore all necessary information about the group and the group member from the token and the local key. For example, when a group member communicates with the key server, the group member provides the member-specific state information to the server through the token. The state information may be protected by the server's local keys. The per-member state can also include information that references the group-specific information and group member specific information.

In an embodiment, token-based re-registration is faster and more efficient than regular registration because it involves a smaller number of steps and less time to complete than that the regular registration process. Further, the cryptographic operations required by token-based re-registration may be single symmetric key decryption operations, and thus require substantially less CPU processing than cryptographic operations required by regular re-registration without tokens. Moreover, token-based re-registration omits several registration message roundtrips and omits the cryptographic processing associated with each protocol message, such as, for example, decryption and integrity checks of messages.

In a GET VPN, handling a flood of re-registration requests received at the key servers may be improved using the token-based re-registration process described herein. Further, token-based re-registration may enable the development of other GET VPN features which require more communication between the group member and the key server.

The key server may generate and store various types of information about the groups and group members. For example, the per-member state information may describe what groups the member may join, member authorization/authentication information, whereas the per-group state information may describe the group policies (e.g. expressive group-based policies), authorization information of the group, and network information. Because the per-member state information and per-group state information may be restored from the key server local secret keys and the token received from the group member, the key server does not have to allocate to that information in volatile or non-volatile storage. Rather than growing with the number of members associated with the groups, requirements for the volatile and non-volatile storage communicatively coupled with the key server may be significantly reduced.

In an embodiment, the key server 130A may be a part of group management systems such as Group Domain of Interpretation (GDOI). GDOI maintains group states for all group members. When applied to GDOI, the encrypted network element state in the token may include enough network element state registration information to set up an IKE Phase 1 Security Association (SA) in the idle state, which may be sent as part of the first GDOI message.

In an embodiment, the encrypted network element state carried in the token may be used in an Informational message contained in a "IKE NOTIFY" packet from the group member to the key server. Sending the "IKE NOTIFY" packet may preclude the need for the group member to notify the key server about group member state through other means, and may allow notifying the key server in a secure manner.

In order to provide scalability of groups in computer networks, key servers may work in clusters acting as single logical units, and may use cooperative protocols to share information about groups. When multiple key servers are working together, the local keys and the local time used in the state-avoidance mechanism described above can be shared across groups. To ensure that these keys are kept secret and the times are synchronized, one of the key servers may be elected as a leader. The leader may be responsible for selecting the keys and setting the time. A cooperative key server protocol may allow the key servers to share local keys with other key servers.

The cooperative key server protocol usually does not pose a scalability problem because the total number of key servers is usually small and sharing the local keys between the key servers is usually manageable. For example, each local key may be associated with a unique identifier that acts in the same way as does GDOI ESP Security Parameter Index (SPI). However, to avoid ambiguity of identifiers, the namespace of the SPIs should be managed so that each SPI value is used only once. If the same SPI values are accidentally reused and the cooperative key server protocol re-assigned the same SPIs to different devices, instead of using the conflicting SPI values, the devices might keep the local keys which the devices generated themselves until the local keys can be expired. However, each local key set should be associated with the time of expiration of the last locally protected state which was protected with the local key set.

3.2 Exchanging a Token Between the Key Server and the Network Element

Figure 4B:
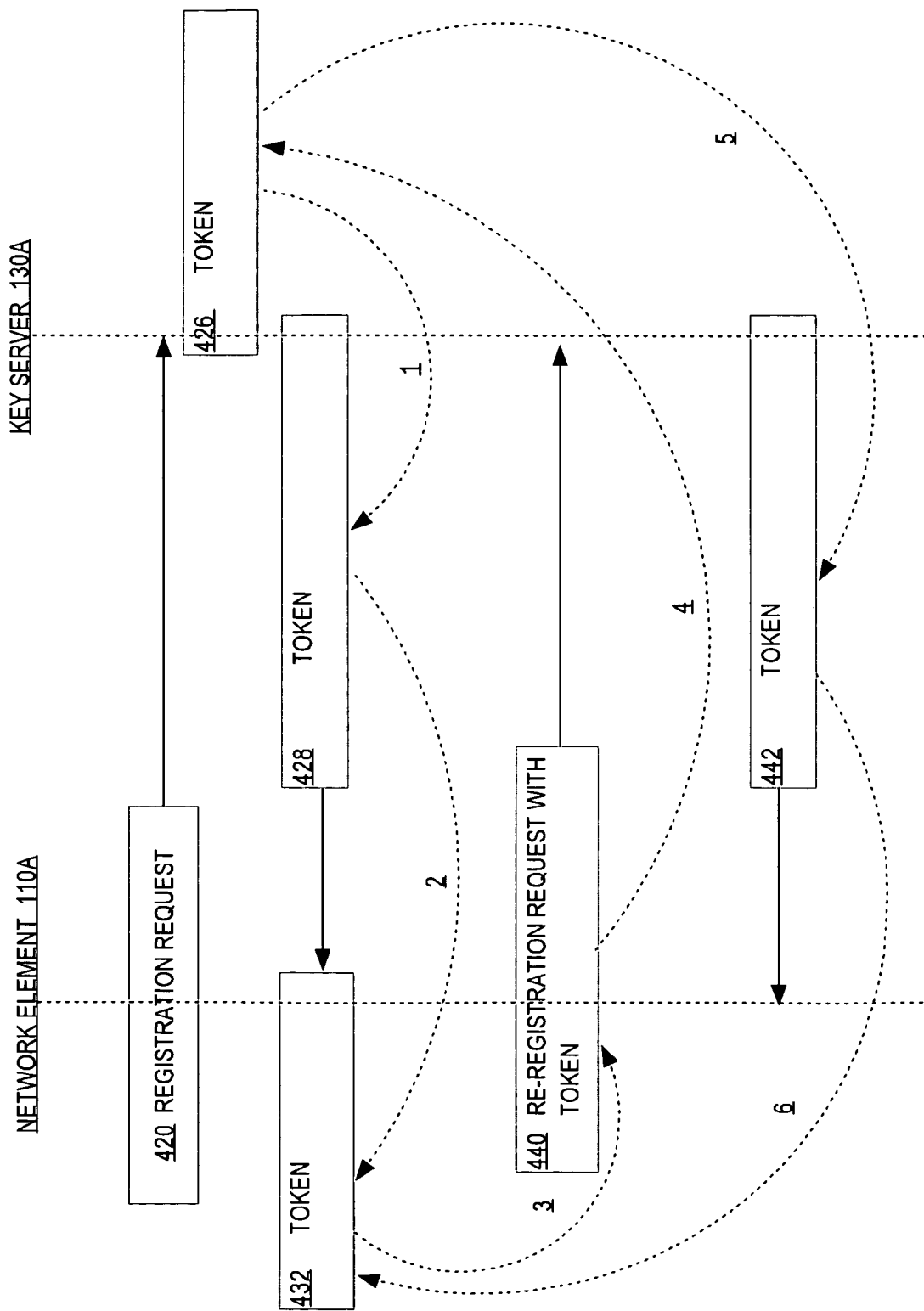
FIG. 4B illustrates a method of exchanging the token between the key server and the network element.

FIG. 4B illustrates exchanging a token between the key server and the network element. To become a member, network element 110A applies for the token by sending registration request 420 to key server 130A. Subsequently, key server 130A authorizes and authenticates network element 110A, and among other functions, generates a group member registration state for the network element, generates token 426, encrypts the token, deletes the group member registration state for the network element, and sends the encrypted token 428 to network element 110A.

Once network element 110A becomes a member, network element 110A receives token 428 and stores it as token 432. Network element 110A may reuse the token in the future, when, for example, network element 110A loses the connection with the group. In such cases, in lieu of repeating the full registration process, network element 110A may use token 432 and send the token to key server 130A along with re-registration request 440. Upon receiving the token, the key server tests and encrypts the token, restores the group member registration state using data from the token, generates a new token, encrypts the new token, deletes the restored group member registration state, and sends the encrypted token to the network element 110A, which becomes successfully re-registered with key server 130A.

In a group member network managed by GDOI, the GDOI re-registration message may be sent as an Informational message containing a "IKE NOTIFY" payload. The GDOI re-registration message may contain the encrypted GDOI registration request (unchanged) and the token encapsulated in the "IKE NOTIFY" payload. Upon receiving the re-registration message, the key server may extract the token from the "IKE NOTIFY" payload, and process the token. The information included in the token may include a representation of the IKE SA, and thus, the following components of the registration state may be verified: initiator/responder cookies in the outer HDR should match the cookies in the decrypted representation of the SA, the source and destination addresses in the IP packet should match the Internet Protocol (IP) address identified in the decrypted representation of the SA, and the client should prove that it possesses the private keying material included in the packet. If the client does not have the correct keying material, authentication of the associated GDOI registration message may fail.

In one embodiment, the token may also have a separate authentication tag used to authenticate the client state. The authentication tag may comprise a time stamp. The time stamp should be sent as part of the authenticated state to record the expiration time of the token. When used as an anti-reply measure, the time stamp might be utilized by the key server to check "freshness" of the token without actually decrypting the client's state.

If that processing of the token under GDOI was successful, the key server may then re-install the registration IKE SA and the keying material from the token, and process the GDOI registration packet as usual.

3.3 Key Server Managing Group Key Registration

Figure 2A:
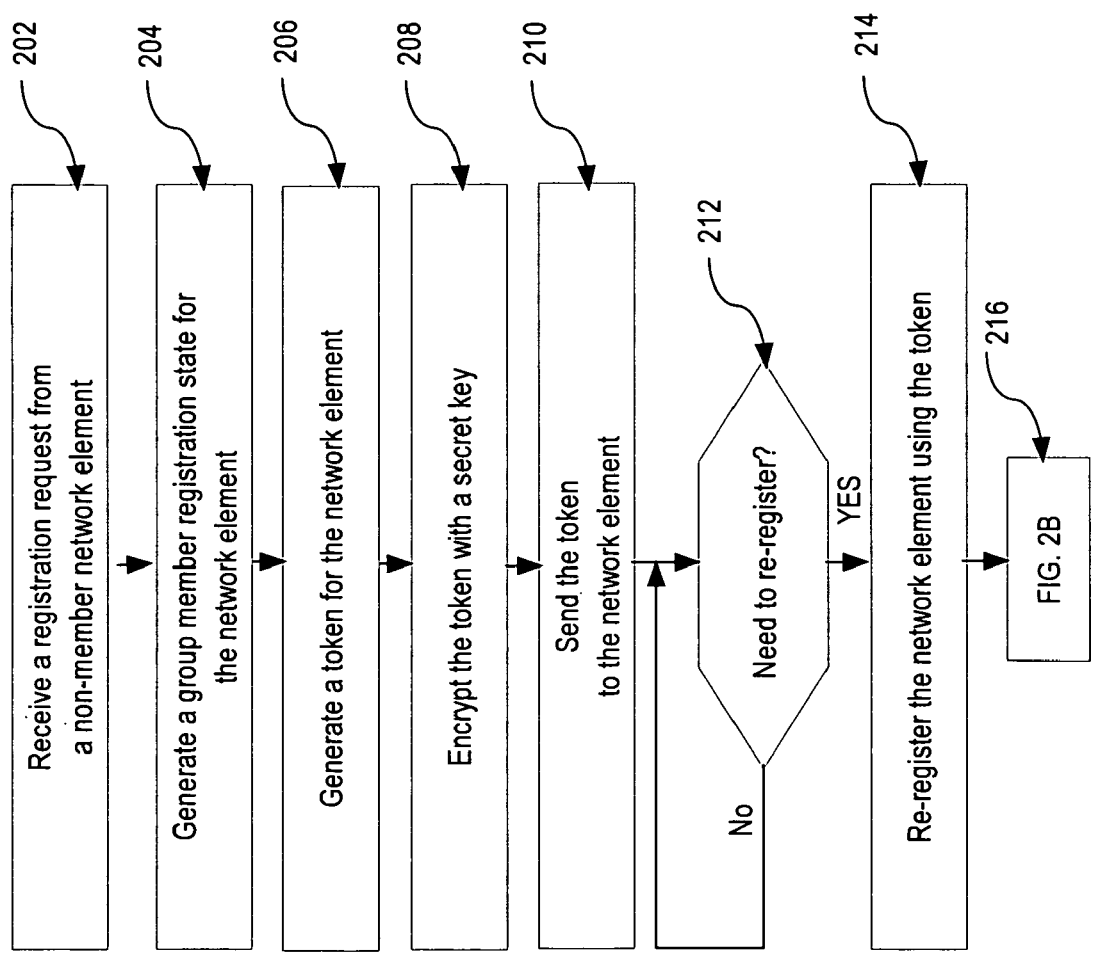
FIG. 2A illustrates a method of group key management registration.

FIG. 2A illustrates a method of group key management registration. In step 202, a key server receives a registration request from a non-member network element. The registration request sent from the network element may, for example, identify the network element, the group the network element wishes to join, the type of the membership the network element wishes to obtain, and group polices. The key server may perform various functions, such as creating and maintaining the group access keys, or enforcing the group policy by granting access to a potential group in accordance with the group policy. The network element may be a computer network user or a client who wishes to join a group or groups supported by the network.

In step 204, the key server generates group member registration state data for the network element. The group member registration state may comprise information identifying the non-member, the requestor's authentication credentials, the authorization characteristics, or shared secret keys. The shared secret keys may be shared between the key server and the client, so that the client and the key server can mutually derive a new set of session keys in the future.

In step 206, the key server generates a token for the network element. The token may comprise, for example, registration state information described above, rules for group access, rules for control and authorization for the group; and information about entities that are authorized to receive access to the group, perform security-relevant actions, keys dissemination, policy creation, initiation of security management actions.

In an embodiment, after the token is generated, the key server deletes the group member registration state for the particular network element. Because storing the group member registration states for all group members would be very taxing on the key server storage space, deleting the group member registration state in cases when the state is restorable lowers the demand on the key server storage space. Because the token combined with the secret key comprises sufficient information to uniquely identify the network element within the group, and because each time the network element attempts to re-register, the network element provides the token, the key server may not need to maintain a copy of the group member registration state.

In an embodiment, in step 208, the key server encrypts the token with a secret key using an encryption method available in the group. For example, if the group operates under GDOI, the token may be encrypted using a GDOI group management secret key.

In step 210, the key server sends the token to the network element. The encrypted token may be sent to the network element as an opaque blob. The token may be sent to the network element in, for example, the payload portion of the packet and can be stored by the network element in a volatile or non-volatile storage communicatively coupled with the network element. The group member may store the token as a part of its own key management state, which the member uses to contact the key server.

In step 212, the network element determines whether it has to re-register with the group. Re-registration may be necessary for any of the reasons previously described herein. If the network element has to re-register, the key server will receive a re-registration request from the network element.

The re-registration request comprises a token. The token is encrypted, and the key server decrypts it using a local key. Using the information in the decrypted token and the local key, the key server rebuilds the network element registration state, determines whether the network element is not expired, and recreate whatever network element group member registration state is necessary to process the first re-registration packet as if the network element registration state had never been deleted.

In step 214, the key server re-registers the network element using the token received from the network element. The re-registration with the token requires that the key server restores the group membership registration state for the network element using the data from the token, generates a new token, encrypts the token and sends the encrypted token to the network element. The re-registration process may be repeated as long as the network element sends a valid re-registration request along with a valid token to the key server.

3.4 Key Server Managing Fast Group Re-Registration

Figure 2B:
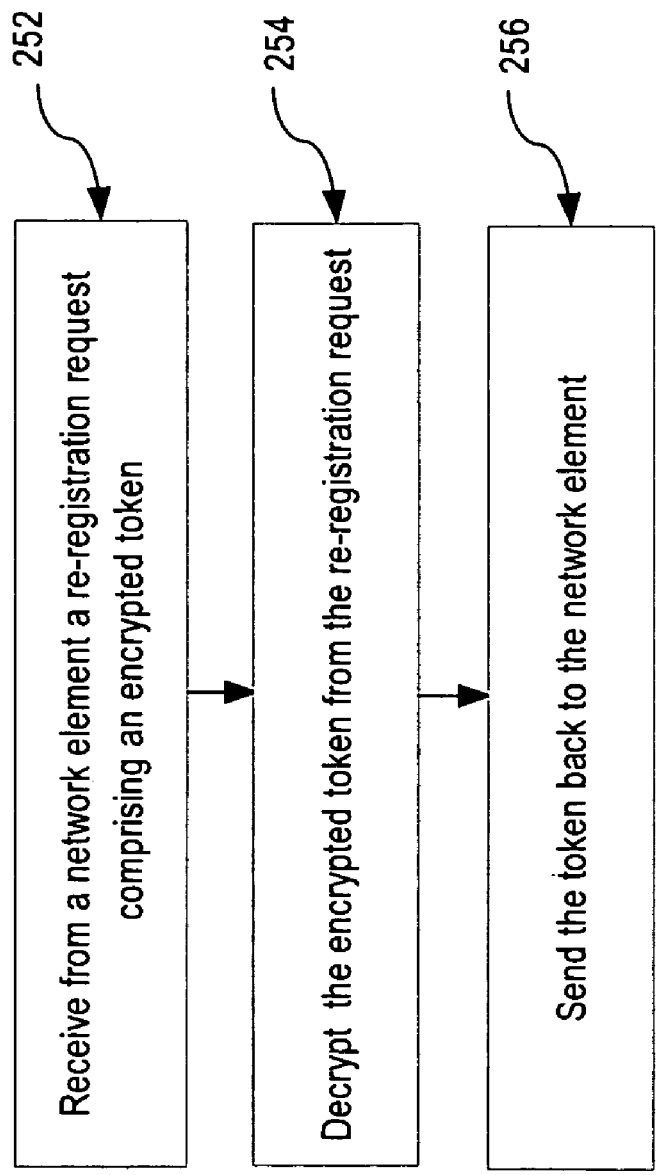
FIG. 2B illustrates a method of group key management re-registration.

FIG. 2B illustrates a method of group key management re-registration. In step 252, the key server receives from a network element a re-registration request comprising an encrypted token. In one embodiment, the token may be sent from the network element as an opaque blob and only the key server may be capable of recognizing that the token is an encrypted object.

In step 254, the key server decrypts the encrypted token included in the re-registration request. In an embodiment, upon decrypting the token, the key server rebuilds the group member registration state and stores information such as client authentication credentials, authorization characteristics, or secret keys in the rebuilt group member registration state.

In step 256, the key server re-registers the network element with the group. The re-registration with the token requires that the key server restores the group membership registration state for the network element using the data from the token, generates a new token, encrypts the token and sends the encrypted token to the network element. The re-registration process may be repeated as long as the network element sends a valid re-registration request along with a valid token to the key server.

3.5 Network Element Joining a Group

FIG. 3A illustrates a method of a network element joining a group. In step 302, the network element sends a registration request to the key server. The registration request, the network element and the key server have been described in detail herein in connection with step 202 of FIG. 2A.

In step 304, the network element receives a token generated by the key server. The network element receives and stores the token without processing the token. The token has been described in detail in connection with step 206 of FIG. 2A.

In step 306, the network element generates group member registration state data. The group member registration state generated at the network element may contain information similar to the information stored in the group member registration state generated by the key server. The group registration state has been described in detail in connection with step 204 of FIG. 2A.

In step 308, the network element stores the token received from the key server in the group registration state until the network element detects a need for re-registering with the group. The network element may store the token in a volatile or non-volatile storage medium.

In step 310, the network element detects a need to re-register. The network element might have to re-register with the group for any of the reasons previously described.

In step 312, the network element retrieves the token from storage and sends the token with a re-registration request to the key server.

In step 314, the network element awaits a new token from the key server. Until the network element receives the new token from the key server, the network element is not re-registered with the group and cannot access the group. Only upon receiving the new token, the network element resumes the status of a group member.

3.6 Network Element Re-Joining a Group

Figure 3B:
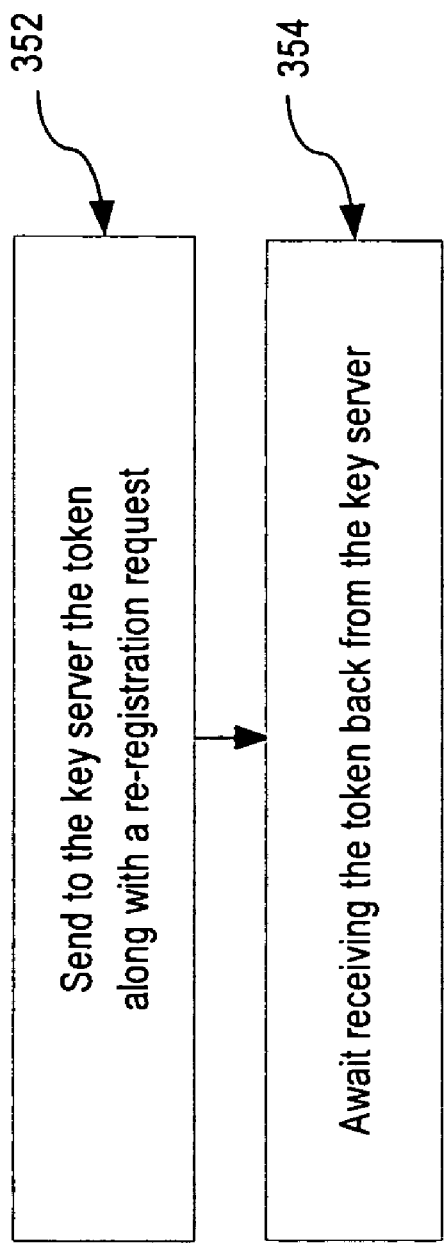
FIG. 3B illustrates a method of a network element re-joining the group.

FIG. 3B illustrates method of a network element re-joining a group. Various circumstances when the network element might want to re-join the group have been provided in the description of FIG. 4A. To re-join the group, the network element sends a re-registration request to the key server managing the group membership within the group.

In step 352, the network element sends the token to the key server.

In step 354, the network element awaits receiving of a new token from the key server. Once the token is returned to the network element, the network element becomes a member of the group.

4.0 Implementation Mechanisms—Hardware Overview

Figure 5:
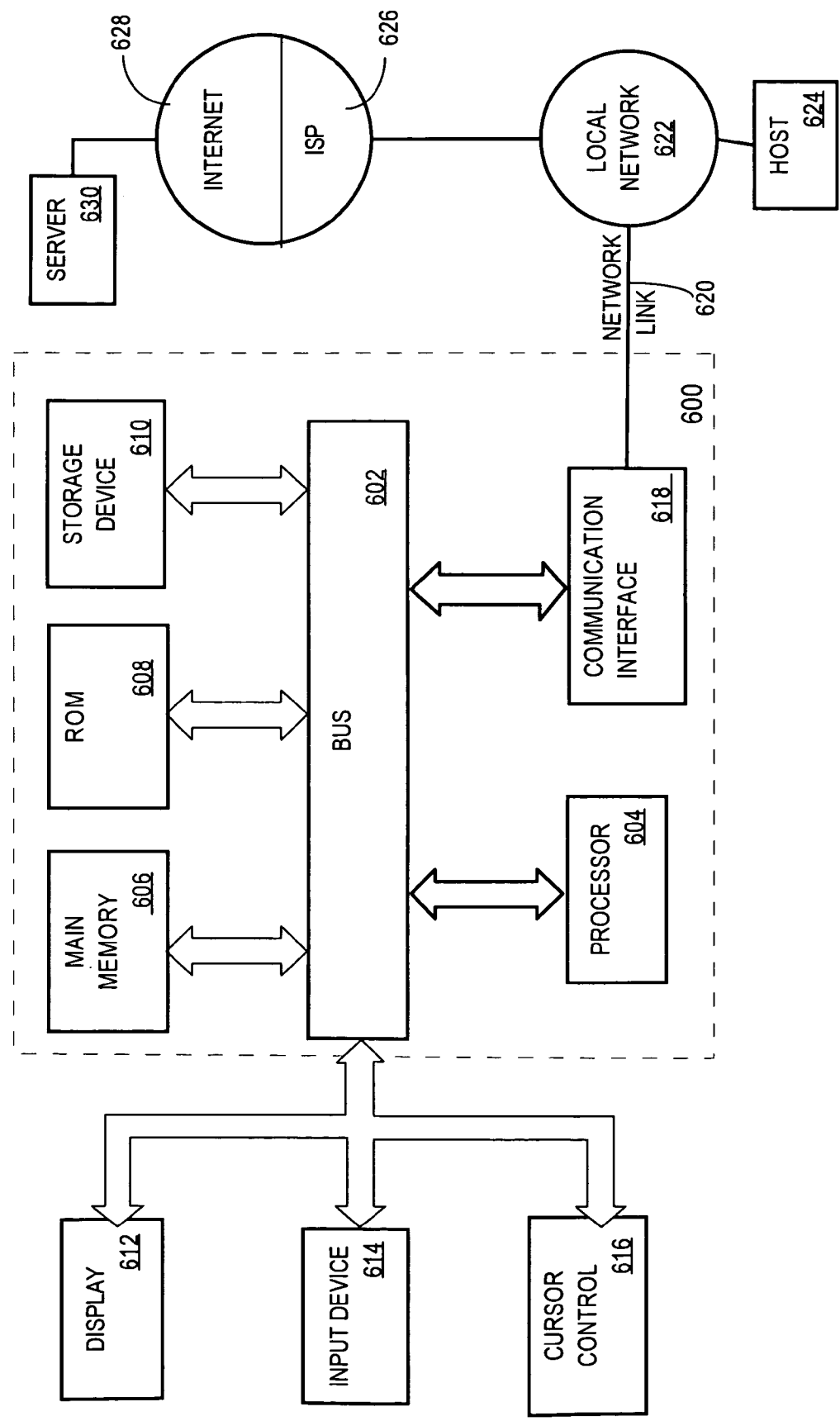
FIG. 5 illustrates a computer system upon which an embodiment may be implemented.

FIG. 5 is a block diagram that illustrates a computer system upon which an embodiment of the invention may be implemented. In FIG. 5, the computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 600, various machine-readable media are involved, for example, in providing instructions to processor 604 for execution. Such a medium may take many forms, including but not limited to storage media. Storage media includes both non-volatile media and volatile media. Non-volatile media includes, for example, optical or magnetic disks, such as storage device 610. Volatile media includes dynamic memory, such as main memory 606.

Common forms of machine-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage device 610, or other non-volatile storage for later execution.

5.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
at a key server:
  receiving a registration request from a network element to join a group of network elements managed by the key server;
  generating and storing a group member registration state comprising information identifying the network element belonging to the group of network elements;
  generating a token using information from the group member registration state, wherein the token identifies the network element belonging to the group of network elements;
  deleting the group member registration state for the network element at the key server;
  generating an encrypted token by encrypting the token using a secret key that is local to the key server;
  sending the encrypted token to the network element;
  receiving a re-registration request from the network element to rejoin the group of network elements, wherein the re-registration request comprises the encrypted token;
  generating a decrypted token by decrypting the encrypted token using the secret key;
  using data from the decrypted token, recovering and storing the group member registration state, comprising information identifying the network element belonging to the group of network elements; and
  re-registering the network element using the information from the group member registration state.

2. The method of claim 1, further comprising:
generating a new token using information from the group member registration state, wherein the new token identifies the network element that has been re-registered;
deleting the group member registration state for the network element that has been re-registered;

generating an encrypted new token by encrypting the new token using the secret key that is local to the key server; and sending the encrypted new token to the network element that has been re-registered.

3. The method of claim 1, wherein communications between the network element and the key server are implemented using a Group Domain Of Interpretation (GDOI) protocol.

4. The method of claim 1, wherein the token further comprises data identifying a communication session between the network element and the key server.

5. The method of claim 1, wherein the sending the encrypted token to the network element further comprises sending a time stamp associated with a moment in time when the token was generated.

6. The method of claim 1, wherein the sending the encrypted token to the network element further comprises encapsulating the encrypted token into an IKE NOTIFY message.

7. The method of claim 1, wherein the encrypted token is treated by the network element as an opaque blob.

8. The method of claim 1, wherein the secret key that is local to the key server is also shared by at least one other key server.

9. A computer-implemented method comprising:
at a network element:
sending a registration request to a key server to join a group of network elements managed by the key server;
receiving a token generated by the key server, wherein the token identifies the network element belonging to the group of network elements;
generating a group member registration state comprising information identifying the network element belonging to the group of network elements;
storing the token in the group member registration state; and
sending a re-registration request along with the token to the key server to re-join the group of network elements managed by the key server.

10. The method of claim 9, further comprising:
awaiting receiving of a new token from the key server as a confirmation that the network element is re-registered with the group managed by the key server.

11. The method of claim 9, wherein communications between the network element and the key server are implemented using a Group Domain Of Interpretation (GDOI) protocol.

12. The method of claim 9, wherein the token further comprises data identifying a communication session between the network element and the key server.

13. The method of claim 9, wherein the token is sent encapsulated in an IKE NOTIFY message.

14. The method of claim 9, wherein the network element treats the token as an opaque blob.

15. A non-transitory computer-readable storage medium storing one or more sequences of instructions which, when executed by one or more processors, causes the one or more processors to perform:

at a key server:
receiving a registration request from a network element to join a group of network elements managed by the key server;
generating and storing a group member registration state comprising information identifying the network element belonging to the group of network elements;
generating a token using information from the group member registration state, wherein the token identifies the network element belonging to the group of network element;
deleting the group member registration state for the network element at the key server;
generating an encrypted token by encrypting the token with a secret key that is local to the key server;
sending the encrypted token to the network element;
receiving a re-registration request from the network element to rejoin the group of network elements, wherein the re-registration request comprises the encrypted token;
generating a decrypted token by decrypting the encrypted token using the secret key;
using data from the decrypted token, recovering and storing the group member registration state, comprising information identifying the network element belonging to the group of network elements; and
re-registering the network element using the information from the group member registration state.

16. The non-transitory computer-readable storage medium of claim 15, further comprising instructions which when executed cause:
generating a new token using information from the group member registration state;
deleting the group member registration state for the network element that has been re-registered;
generating an encrypted new token by encrypting the new token using the secret key that is local to the key server; and
sending the encrypted new token to the network element that has been re-registered.

17. The non-transitory computer-readable storage medium of claim 15, wherein communications between the network element and the key server are implemented using a Group Domain Of Interpretation (GDOI) protocol.

18. The non-transitory computer-readable storage medium of claim 15, wherein the token further comprises data identifying a communication session between the network element and the key server.

19. The non-transitory computer-readable storage medium of claim 15, wherein the sending the encrypted token to the network element further comprises sending a time stamp associated with a moment in time when the token was generated.

20. The non-transitory computer-readable storage medium of claim 15, wherein the sending the encrypted token to the network element further comprises encapsulating the encrypted token into an IKE NOTIFY message.

* * * * *